United States Patent
Galbraith

(10) Patent No.: US 6,557,519 B1
(45) Date of Patent: May 6, 2003

(54) RECIPROCATING MACHINE WITH TWO SUB-CHAMBERS

(75) Inventor: Peter Afton Galbraith, West Midland (AU)

(73) Assignee: Galbraith Engineering Pty Ltd., Western Australia (AU)

(*) Notice: Subject to any disclaimer, the term of this patent is extended or adjusted under 35 U.S.C. 154(b) by 0 days.

(21) Appl. No.: 09/786,101

(22) PCT Filed: Sep. 1, 1999

(86) PCT No.: PCT/AU99/00708

§ 371 (c)(1),
(2), (4) Date: Feb. 28, 2001

(87) PCT Pub. No.: WO00/12881

PCT Pub. Date: Mar. 9, 2000

(30) Foreign Application Priority Data

Sep. 1, 1998 (AU) .............................................. PP 5583

(51) Int. Cl.[7] .............................................. F02B 19/00
(52) U.S. Cl. ...................... 123/256; 123/261; 123/270; 123/275
(58) Field of Search ................................. 123/256, 275, 123/265, 276, 270, 273, 254, 261–263

(56) References Cited

U.S. PATENT DOCUMENTS

| | | | |
|---|---|---|---|
| 3,815,566 A | 6/1974 | Staggs | |
| 5,025,765 A | * 6/1991 | Kawamura | ................ 123/254 |
| 5,778,849 A | 7/1998 | Regueiro | |
| 6,095,111 A | * 8/2000 | Ueda et al. | ................ 123/254 |

FOREIGN PATENT DOCUMENTS

| | | |
|---|---|---|
| DE | 1 476 351 | 2/1966 |
| EP | 0 237 065 | 3/1987 |
| EP | 0 675 273 | 3/1995 |
| GB | 1046104 | 5/1963 |
| GB | 1131943 | 2/1965 |
| JP | 62-51718 | 3/1987 |
| JP | 51-57002 | 6/1993 |

* cited by examiner

Primary Examiner—Johnny Hoang
(74) Attorney, Agent, or Firm—Merchant & Gould P.C.

(57) ABSTRACT

A reciprocating machine includes a housing (12) and piston means (20) that are cyclically relatively displaceable along an axis (11) to define a variable volume working chamber (50). There is further provided air inlet means and fuel inlet means (100) admitting air and fuel to the working chamber for forming an ignitable mixture after compression of the air therein, and means to exhaust combustion products from the working chamber. The variable volume working chamber (50) includes at least two sub-chambers, a combustion chamber (54) and a main chamber (52) mutually displaced on the axis (11) and in communication at a cross section (53) at which gas in the combustion chamber (54) may expand at least partially laterally as it flows from the combustion chamber (54) into the main chamber (52). The air admission means, the exhaust means and the chambers (52, 54) are arranged so that a swirl of gas is generated and maintained about the axis (11) in both chambers (52, 54) during operation of the machine.

83 Claims, 6 Drawing Sheets

FIGURE 3 SECTION B B

RECIPROCATING MACHINE WITH TWO SUB-CHAMBERS

FIELD OF THE INVENTION

This invention relates generally to reciprocatory machines, including those operable as internal combustion engines, but in a particularly preferred embodiment relates to an improved sleeve valved engine.

BACKGROUND ART

In recent decades, substantial research effort has been expended on a quest for a commercially practical adiabatic engine. A useful reference on the topic is "The Adiabatic Engine", published by the Society of Automotive Engineers (SAE) in 1984 as part of its *Progress in Technology Series* (No. 28). Most of the uncooled adiabatic engines produced for research purposes under various programs made extensive use of ceramic insulation inserts as, for example, cylinder and combustion chamber liners, piston caps, headface plates, valve seats, valve housings and valve guides. These programs generally examined the feasibility of ceramic lined adiabatic engines, and yttria partially-stabilised zirconia (PSZ) was considered to be a particularly promising ceramic for the purpose. The research programs contributed significantly to advanced engine design, but the reality is that there is today no successful adiabatic production engine. The principal problems encountered have included a short ceramic life, an inability to identify lubricants which performed satisfactorily at the high temperatures involved, an inability to obtain greater expansion energy within the cylinder and hence the need to extract energy from the exhaust gases by secondary expansion. A further problem was the substantial decrease in volumetric cylinder efficiency due to the heating effect of hot cylinder/combustion chamber surfaces on the incoming air charge.

Several contributors to the above cited publication, including GM, Cummins and Komatsu, conclude that it is not possible to achieve practical adiabatic engine operation without high exhaust gas temperatures, turbo-charging or super charging (preferably with intercooling) and secondary expanders. A design by Kirloskar relied on vertically aligned cylinder fins and air cooling by convection, but achieved only a low level of adiabatic operation.

At a somewhat earlier time, the use of heat-insulated members adjacent to the combustion space was proposed by Sir Harry Ricardo for several purposes in enhancing the performance of high speed engines. In his classic text, "The High Speed Internal-Combustion Engine", Fourth Ed 1953 (Blackie & Son Glasgow), Ricardo suggests the use of a heat-insulated member placed well out of the path of the entering air. He suggests that such a member would be easy to provide for in a compression swirl engine, and possibly in an induction swirl engine, of either the sleeve valve 4-stroke or the 2-stroke type, but could only be fitted with great difficulty, or with breathing restrictions, in an open chamber poppet valve 4-stroke engine. The heat-insulated member is said by Ricardo (at page 26 of the aforementioned text) to serve the functions of raising the compression temperature without reducing the density and, if suitably positioned and proportioned, to keep the delay period constant in terms of crank angle, thus allowing a fixed time of injection throughout the entire speed range. Ricardo further suggests that the heat-insulated member would also be useful because its surface temperature will be high enough to prevent the deposition of carbon or ash, and if so placed that the jet of fuel impinges upon it, it will eliminate completely the building-up of deposits in this zone, particularly when using high ash content fuels.

In Ricardo's textbook, there is also discussion, at pages 102–115, of a heat-insulated member in the context of compression swirl compression chambers. A particular form is illustrated in FIG. 7.13 by way of an annular heat-insulated lining for the combustion chamber wall, in the context of a sleeve-valve combustion chamber. In respects other than the presence of the lining, this illustration is typical of sleeve valved compression-ignition engines, in that the combustion chamber was formed in the so called junkhead by a cylindrical wall substantially smaller in diameter than the main cylinder wall guiding the piston and the valve sleeve. The arrangement illustrated in FIG. 7.13 of the Ricardo text would not be practical, however, since differential expansion between the junkhead body and the liner could be expected to cause practical difficulties as operating temperatures varied, leading to sealing and/or mechanical and/or fatigue failures. A loss of heat insulation would then result, due to the annular space filling with soot and/or carbonised oil.

In sleeve-valved compression ignition engines, the sleeves typically oscillated both longitudinally and circumferentially and a common feature of the engines was admission of the air in a manner which generated a high speed revolving swirl of the air in the chamber, thus enhancing mixing and combustion. Sir Harry Ricardo described typical swirl ratios for 4-stroke operation (ie. swirl RPM relative to crankshaft RPM), for highest brake mean effective pressure and lowest brake specific fuel consumption, of the order of 10.

Ricardo also developed a series of indirect injection combustion chambers, illustrated for example in his aforementioned text at FIGS. 7.7 and 7.10. Engines of similar type are disclosed in British Patent 1046104, in Japanese patent publication 62-051718 and German patent publication 1476351. These indirect injection systems involved localized swirls at the transit passage into the main chamber.

Engines having co-axial combustion chambers smaller than the main chamber are disclosed in U.S. Pat. Nos. 3,815,566 and 5,778,849, and in Japanese patent 5-157002. In U.S. Pat. No. 3,815,566, a perforated baffle separates the chambers.

It is an object of the invention to provide an internal combustion engine of enhanced thermal efficiency, and in one or more embodiments, to provide an improved adiabatic engine.

SUMMARY OF THE INVENTION

The present invention provides an internal combustion engine including:
- a housing and piston means that are cyclically relatively displaceable along an axis to define a variable volume working chamber;
- means to admit air and fuel to said working chamber for forming an ignitable mixture after compression of the air therein; and
- means to exhaust combustion products from the working chamber;
- wherein said variable volume working chamber includes at least two sub-chambers mutually displaced on said axis and in communication at a cross section at which gas in one sub-chamber may expand at least partially laterally as it flows from said one sub-chamber into the other sub-chamber;

wherein said air admission means, said exhaust means and said sub-chambers are arranged so that a swirl of gas is generated and maintained about said axis in both of said sub-chambers during operation of the engine;

and wherein said one sub-chamber is sealed and defined laterally and at an end by integral heat resistant and/or low thermal conductivity wall structure having a surrounding heat insulation jacket and associated heat dissipation means, arranged so that, during operation of the engine, the surfaces of the wall structure bounding said one sub-chamber are maintained at a temperature which is substantially higher than wall surfaces bounding said other sub-chamber.

Advantageously, said sub-chambers are arranged whereby the engine operates in a direct injection mode.

Said fuel admission means may include a fuel injector with a flow passage through said wall structure but preferably includes a fuel injector mounted intimately in a complementary opening or recess in said integral wall structure. The fuel injector preferably includes passages for cooling its tip.

The flow passage is advantageously arranged to open into said working chamber at a radius that divides the said one sub-chamber into a central cylindrical portion and an annular outer portion, which portions are of substantially equal volumes.

Said one sub-chamber is typically of mean width D and mean length L away from said cross-section where gas in one sub-chamber may expand at least partially laterally as it flows from said one sub-chamber into the other sub-chamber. The ratio L/D is preferably 0.9 or greater. In the simplest and most preferred case, said one sub-chamber is cylindrical, of diameter D and axial length L. Said cross-section is preferably equal to or less than said one sub-chamber.

Passages or galleries may be provided in a main cylinder of said housing extending about said other sub-chamber, for flowing lubricant therethrough, which lubricant is thereby effective to reduce or control temperatures and/or temperature differences across or around said cylinder, while being thereby heated to a desired functional viscosity.

The swirl of gas in said other sub-chamber is preferably such that there is formed therein a swirling cooler boundary layer, preferably effective to cool the peripheral and end walls of said other sub-chamber.

Preferably, the swirl of gas is such that the swirl ratio in said one sub-chamber is at least 6:1, and more preferably in the range from about 10:1 to about 25:1. In said other sub-chamber, the swirl ratio is preferably at least 3:1. The swirl of gas in said one chamber may be such that there is a radial temperature gradient in the gas flow of said one sub-chamber, with a relatively hotter core and a relatively cooler periphery.

In a preferred embodiment, the air admission means and the exhaust means include ports in said housing, and reciprocable sleeve valve means controlling the ports. Said one sub-chamber is then preferably disposed within junkhead means opposed to said piston means.

Preferably, the housing and ports are such as to allow no or minimal preheating of incoming air charges by hot combustion chamber walls.

Said housing may include respective cylindrical portions laterally defining said sub-chambers, and an annular shoulder between said cylindrical portions opposed to said piston means. The shoulder is preferably provided by an annular head member, and said heat dissipation means may include annular neck means bridged to said wall structure for reducing thermal conductance from the wall structure to the annular head member. Said shoulder and said neck means are advantageously formed integrally with said wall structure defining said one sub-chamber.

Preferably, in operation, the engine exhibits at least near adiabatic operation.

In an alternative embodiment, said one sub-chamber is substantially defined within said piston means.

Preferably, said sub-chambers are generally axially symmetrical about said axis, which is a longitudinal generally centre line axis of said housing.

The invention also provides, in a further aspect, an internal combustion engine including:

a housing and piston means that are cyclically relatively displaceable along an axis to define a variable volume working chamber;

means to admit air and fuel to said working chamber for forming an ignitable mixture after compression of the air therein; and means to exhaust combustion products from the working chamber;

wherein said variable volume working chamber includes at least two sub-chambers mutually displaced on said axis and in communication at a cross section at which gas in one sub-chamber may expand at least partially laterally as it flows from said one sub-chamber into the other sub-chamber;

wherein said one sub-chamber is of mean width D and mean length L away from said cross-section, and the ratio L/D is 0.9 or greater; and wherein said air admission means includes intake ports positioned and arranged to impart a swirl to gases in said chamber about said axis, including said laterally expanding gas flowing from said one sub-chamber into said other sub-chamber, whereby there is formed, during operation of the engine, a swirling cooler boundary layer in said other sub-chamber and a swirling flow in said one sub-chamber, the swirl ratio of said swirling flow in said one chamber being at least 6:1, preferably in the range 10:1 to 25:1.

The invention still further provides a method of operating an internal combustion engine at least near adiabatically, which engine has a housing and piston means defining a working chamber, the method including:

cyclically relatively displacing said housing and piston means along an axis to define a variable volume working chamber;

admitting air and fuel to said working chamber;

compressing the air in the working chamber to form an ignitable mixture;

causing combustion of the compressed air/fuel mixture;

exhausting gases from the working chamber including causing the gases to expand at least partially laterally as the gases flow from one sub-chamber of said working chamber into the other sub-chamber thereof; and generating and maintaining a swirl of gas about said axis in both of said sub-chambers while the engine is operating;

wherein the wall surfaces bounding said one sub-chamber are maintained at a temperature which is substantially higher than wall surfaces bounding said other sub-chamber.

The ignitable mixture may be ignitable e.g. by compression ignition, or by spark or glow plug ignition. The air and fuel may be mixed in the working chamber, or partially or wholly externally of the chamber.

In general, the apparatus may perform a function other than as an engine, eg. a pump or compressor. More generally then, the invention provides a reciprocatory machine, including:

a housing and piston means that are cyclically relatively displaceable along an axis to define a variable volume working chamber;

means to admit fluid to said working chamber; and means to exhaust fluid products from the working chamber;

wherein said variable volume working chamber includes at least two sub-chambers mutually displaced on said axis and in communication at a cross section at which gas in one sub-chamber may expand at least partially laterally as it flows from said one sub-chamber into the other sub-chamber;

wherein said fluid admission means, said exhaust means and said sub-chambers are arranged so that a swirl of fluid is generated and maintained about said axis in both of said sub-chambers during operation of the machine;

and wherein said one sub-chamber is defined laterally and at an end by a wall structure with associated heat dissipation means arranged so that, during operation of the machine, the surfaces of the wall structure bounding said one sub-chamber are maintained at a temperature which is substantially higher than wall surfaces bounding said other sub-chamber.

Any of the relevant preferred, advantageous and optional features set out above for the engine may also be included in the reciprocatory machine.

BRIEF DESCRIPTION OF THE DRAWINGS

The invention will be further described, by way of example only, with reference to the accompanying drawings, in which.

PREFERRED EMBODIMENTS

Figure 1:
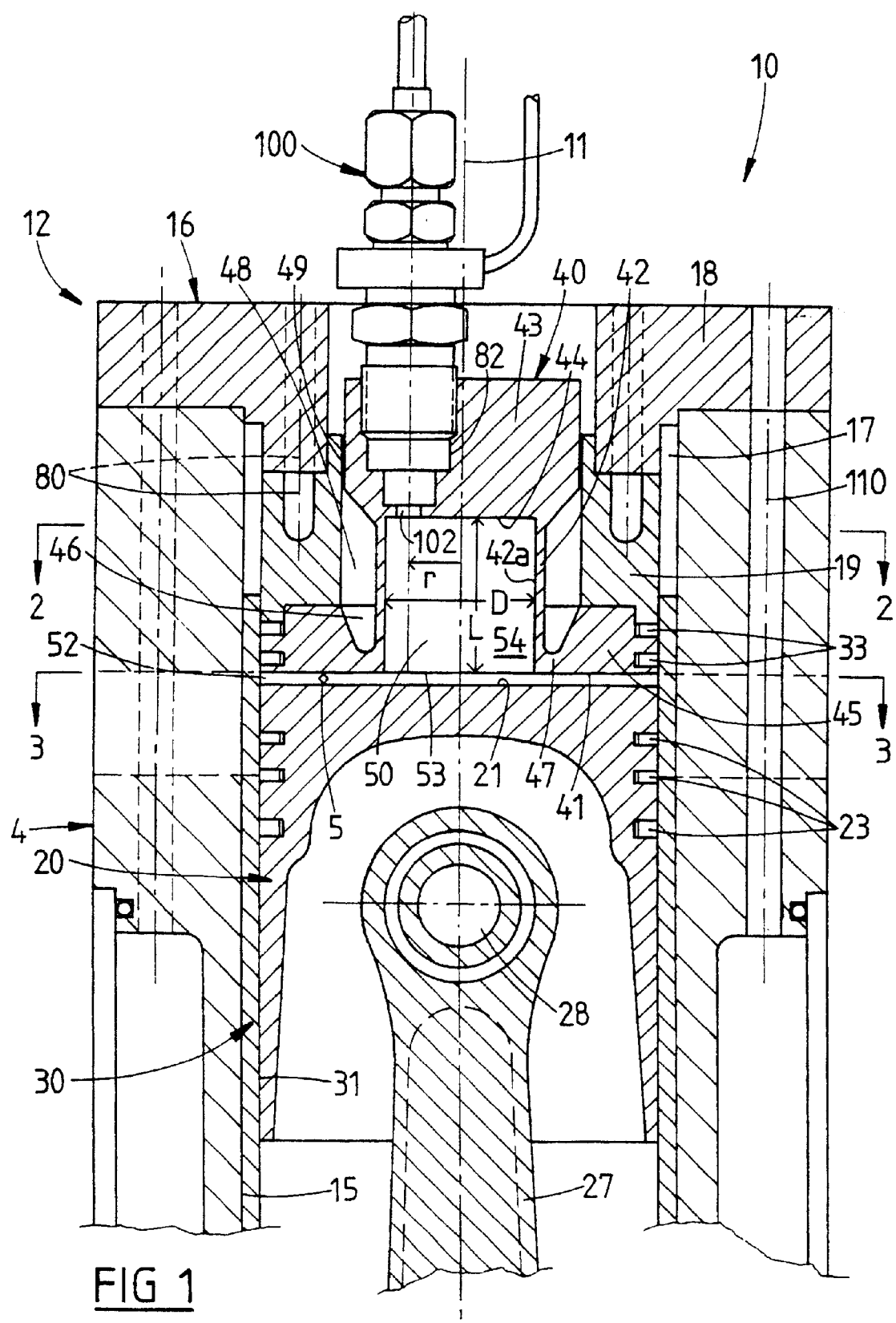
FIG. 1 is a cross-sectional view of the working end of a 4-stroke single cylinder sleeve-valved near-adiabatic diesel engine according to an embodiment of the present invention.
Figure 2:
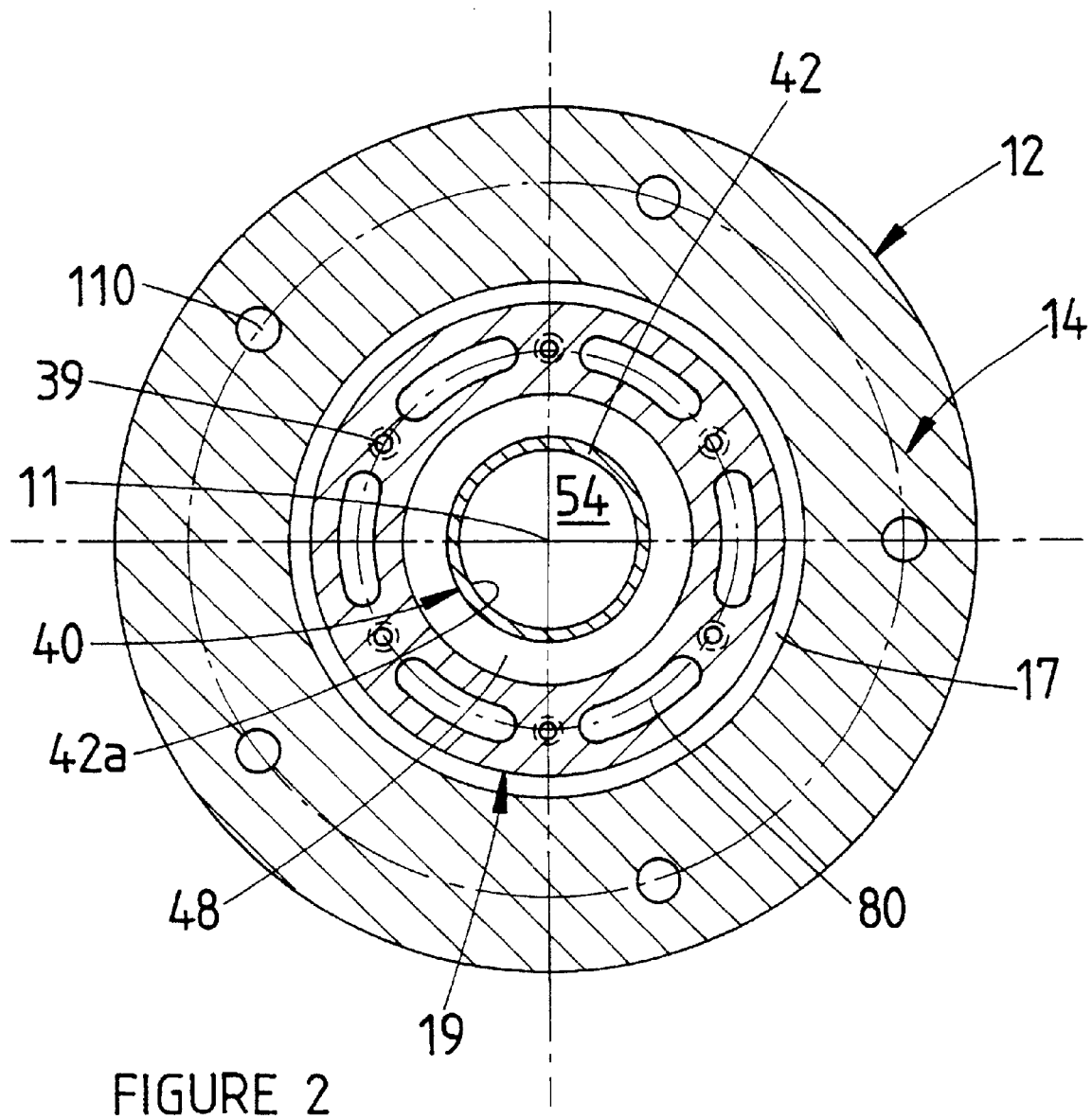
FIGS. 2 and 3 are respectively cross-sections on the lines 2—2 and 3—3 in FIG. 1.

The illustrated 4-stroke single cylinder sleeve-valved diesel engine 10 is conventional to the extent that it includes a housing 12 consisting of a main cylinder 14 and junkhead 16, a reciprocable piston 20, and an annular valve sleeve 30 having an axis 11 that forms an axis for the engine configuration. Valve sleeve 30 is both axially and circumferentially reciprocable along the interior surface 15 of cylinder 14, while piston 20 is in turn axially reciprocable in the space defined within the internal cylindrical surface 31 of sleeve 30. The crown 21 of the piston approaches but does not quite touch an annular shoulder 41 of junkhead 16 (the minimum gap is commonly referred to as the squish height s), and the piston carries sealing or piston rings 23 for sealing the interface with sleeve 30. That part of the junkhead that protrudes concentrically within main cylinder 14 is spaced from cylinder surface 15 to define an annular recess 17 that receives the reciprocating sleeve. The interface between the sleeve and junkhead is in turn sealed by a pair of rings 33 carried by the junkhead just outwardly of shoulder 41. Piston crown 21 may include a heat insulating insert as is known.

The reciprocation of the piston with respect to the cylinder and junkhead is effective to define a variable volume working chamber 50 sealed by rings 23, 33 and comprised of two sub-chambers 52, 54. Sub-chamber 54 may be non-cylindrical or may be restricted at its mouth 53 but is here a cylindrical sub-chamber defined within junkhead 16 so as to be co-axial with axis 11, of uniform diameter D and axial length L. For direct injection, as in the illustrated embodiment, mouth 53 is typically of a cross-section equal to the cross-section of sub-chamber 54. For indirect injection, the mouth will usually be smaller in cross-section than the sub-chamber 54. Sub-chamber 52 lies between shoulder 41 and piston crown 21, and is bounded by these surfaces and by the inner cylindrical face 31 of valve sleeve 30, thereby also having axis 11 as its axis. At its smallest, sub-chamber 52 is of axial extent equal to the squish height s. It will be appreciated that the arrangement of the sub-chambers is such that the engine operates in direct injection mode.

In keeping with conventional terminology, sub-chamber 52 is hereinafter referred to as the main chamber 52, and sub-chamber 54 as the combustion chamber 54, but it is emphasized that the latter term does not suggest that combustion is confined to sub-chamber 54.

Figure 4:
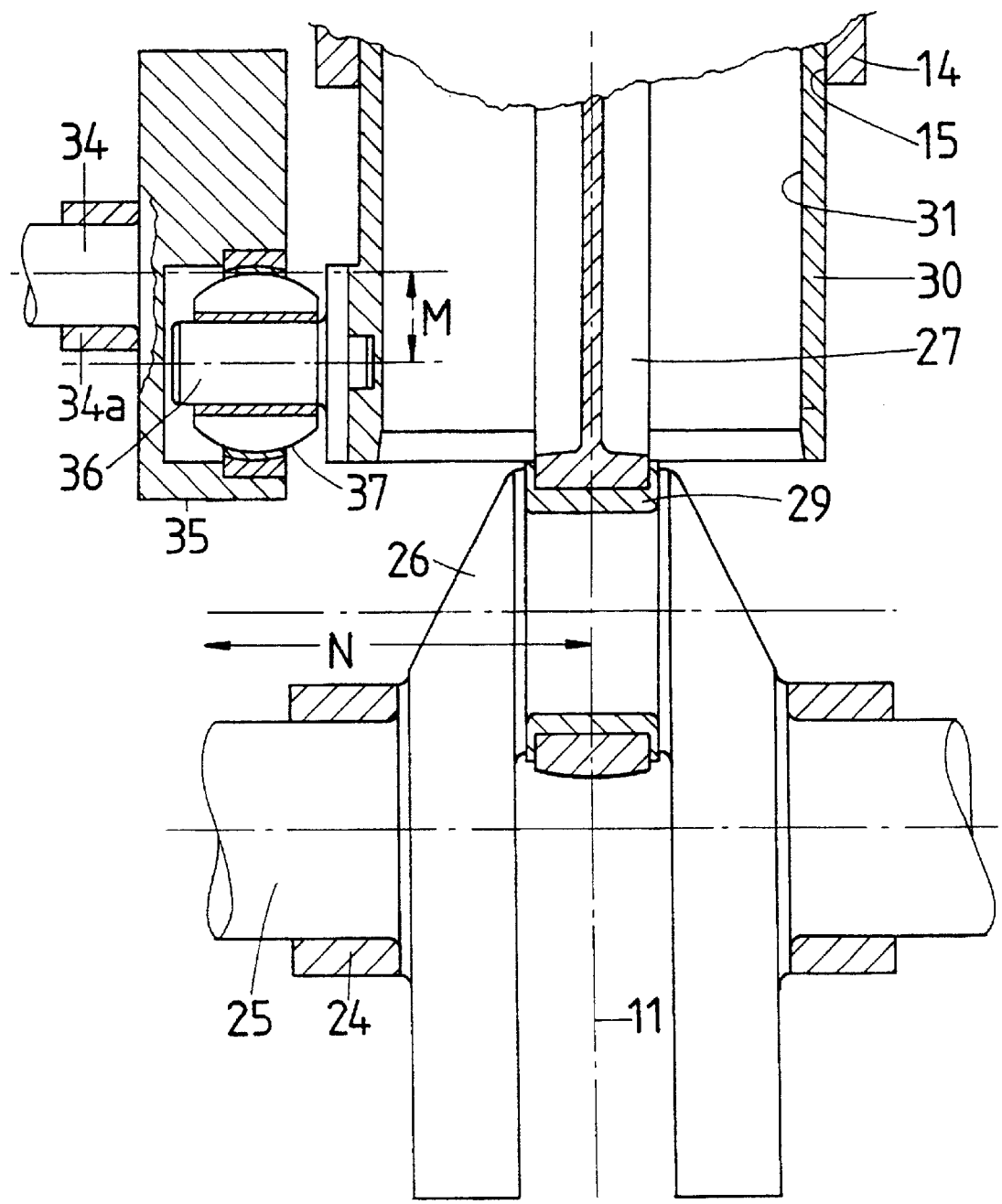
FIG. 4 is a fragmentary cross-section of the driving end of the engine of FIG. 1 showing the piston and sleeve drive linkages.

With reference to FIG. 4, piston 20 is driven in the usual manner from crankshaft 25 via crank 26 and connecting rod 27, the latter being pivotally attached to the piston by, gudgeon pin 28. Crankshaft 25 is supported in bearings 24, while conrod 27 pivots on bearing sleeve 29 carded by the crank 26. Valve sleeve 30 is driven from the crankshaft (not shown) via a sub-shaft 34, bearing 34a, crank 35, and pin 36 fixed to the lower end of the sleeve and supported in crank 35 by a spherically mounted bearing 37.

Figure 3:
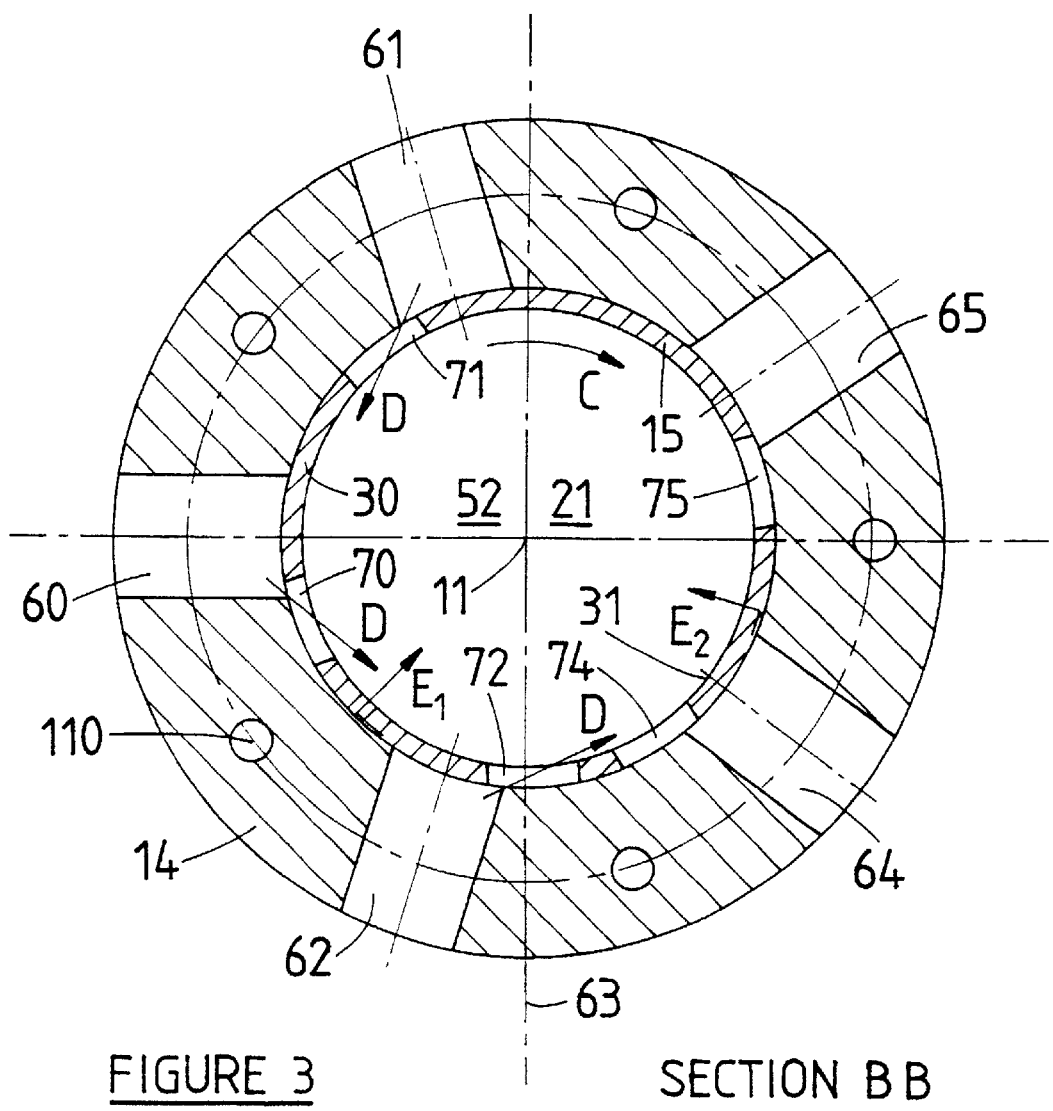

Inlet and exhaust ports are arranged about main chamber 52 as radial openings in cylinder 14. A preferred configuration is illustrated in FIG. 3, and in FIGS. 5 to 8. This consists of a total of five similar equiangularly spaced ports, comprising three inlet ports 60, 61, 62, symmetrically at one side of a diametral plane 63, and exhaust ports 64, 65 on the other side of plane 63. Matching control ports 70–75 are provided in sleeve 30 and the circumferential movement of the sleeve is such as to cause a fine initial opening of the inlet ports, whereupon inlet air is directed obliquely into main chamber 52 in the direction of the arrows D in FIG. 3, and generates a high speed swirling effect about the axis 11 of the main chamber 52. Movement of the sleeve 30 in the direction of the arrow C will complete opening of the inlet ports by bringing control ports 70, 71, 72 into register with inlet ports 60, 61, 62, but the high speed swirl already generated about main chamber 52 will be maintained for the whole cycle of operation, both in main chamber 52 and, at a higher speed, into combustion chamber 54, where the swirl is effective to enhance mixing, to shorten the ignition delay period, and to facilitate use of single spray injectors.

A swirl generated by oblique air entry is a known characteristic of sleeve-valved engines, and combustion chamber swirl ratios (ie. swirl RPM versus crankshaft RPM) of the order of 8 to 10 are typically observed. However, in the context of the present invention, it is thought that the swirl may have important novel effects to be further described below.

Further detail concerning port configuration and operation, and swirl ratios, is provided later in this description.

The structure of junkhead 16 will now be described in greater detail. The principal central component is an integral body 40 of a heat resistant, preferably relatively low thermal conductivity material. A suitable such material is stainless steel but alternative materials may be employed, eg. especially steel alloys containing nickel and/or chromium, and ceramics. Body 40 has a relatively thin-walled skirt portion 42 which defines combustion chamber 54, and an enlarged solid head 43 which closes one end of combustion chamber 54 and provides an end wall and/or surface 44 for the combustion chamber. At the other end of body 40, about the open end of combustion chamber 54, body 40 has a flange 45 that provides the aforementioned shoulder 41 bounding main chamber 52 and thereby forms a head plate for the main chamber.

Junkhead 16 is completed by an outer annular headcap 18 and an intermediate mounting ring 19. As can be well seen from FIG. 1, a radially inner portion of headcap 18 is fixed to one end of ring 19 and the other end of ring 19 is fixed in turn to head plate 45, both connections being by respective rings of bolts, screws or studs 39. Alternatively, shrink or other well known assembly methods could be used. Assembly is completed by securing the outer part of headcap 18 onto the end of main cylinder 14. The arrangement is such that headcap 18 and ring 19 extend about the portions 42, 43 of heat-resistant body 40, and have outer matching cylindrical surfaces positioned to define annular space 17 to receive sleeve 30. Headcap 18 and mounting ring 19 are typically formed in low-cost cast materials such as aluminium or iron. Sealing rings 33 are respectively housed in a space between a peripheral rebate in head plate 45 and a lip of mounting ring 19, and in a groove of head plate 45.

Passages or galleries 80 may be provided for circulating cooling fluid within headcap 18 and ring 19, but the means for dissipating heat from heat resistant body 40 is such as to restrict the heat flow and thereby allow the interior surfaces 42a, 44 of body 40 to achieve a much higher equilibrium temperature than is conventional in the junkhead combustion space of sleeve-valved engines. This objective is achieved in two ways. Firstly, head plate 45 is peripherally undercut at 46 so that the main body of head plate 45 is linked to cylindrical body portion 42 only by a relatively narrow annular neck 47. Secondly, the undercut 46 forms with an annular space 48, between ring 19 and cylindrical body portion 42, and under head 43, an insulating air jacket or curtain which is aspirated to the exterior via a small annular gap 49 separating solid head 43 of heat-resistant body 40 from the surrounding body of junkhead 16. Alternatively annular space 48 may be filled with a suitable high-temperature insulating material to minimise radiant and convected heat loss from the surface of body portion 42.

Solid head portion 43 of heat-resistant body 40 is formed with a multiply stepped opening 82 to firmly seat and complement a fuel injector 100. In this way, fuel injector 100 is intimately mounted in the opening 82 so as to be in a sense integral with the body 40. The nozzle tip 102 of injector 100 may be flush with the end face 44 of combustion chamber 54. Alternatively, it may be set back or forward of end face 44. Preferably, either the injector is fitted with standard internal cooling galleries, or alternatively cooling passages are provided in the solid head 43 of heat-resistant body 40, in order to protect the tip passages and materials at the high temperatures involved in this case.

The orifice of tip 102, and the axis of the injector extending parallel to the main axis 11 of the system, are centered on a radius that divides combustion chamber 54 into an inner cylindrical portion and an outer annular portion that are of substantially equal volume. It is believed by the present applicant that this is a more favourable position for the fuel injection than the conventional position favoured by Ricardo ie. with the injector axis as close as practicable to the lateral cylindrical surface of the chamber to optimise mixing of air and fuel.

It should be noted that, the aforementioned passages or galleries 80 to circulate cooling fluid within headcap 18 and ring 19 were provided in the prototype as a precautionary measure to ensure that the injector tips were not overheated. Testing has shown that, in fact, correct detail design/ selection of;

(1) the injectors and their mounting within the heat resistant body 40;

(2) the L/D ratio for combustion chamber 54;

(3) the design of annular space 48 and use or choice of insulation within it; and (4) headcap 18 and heat resistant body 40 will allow deletion of cooling galleries 80. As will be further discussed, this allows the engine to be designed or operated without any specific cooling means whatsoever other than the very small amount of heat naturally radiated or convected from the engine's external surfaces.

Turning now to the operation of the engine, the 4-stroke diesel or compression ignition cycle is generally conventional in relation to successive movements of the piston and the sequence of port opening and closing. The piston compresses gases during the compression stroke, fuel is injected and, after a delay period, combustion commences and the expansion stroke drives the piston down. At top dead centre of the compression stroke, piston crown 21 is close to shoulder 41 but separated by the squish height, leaving a combustion chamber comprising primarily combustion chamber 54 but also a minimalist main chamber 52. The second upstroke of the piston exhausts gases through ports 64, 65—with port opening controlled by longitudinal movement of the sleeve 30 and port closing by circumferential movement of the sleeve—while the second downstroke draws in fresh air through ports 60, 61, 62: here, port opening is controlled by circumferential movement of sleeve 30 and closing by longitudinal movement.

FIGS. 5, 6, 7 and 8 are partial developed elevations (at twice the size or scale of FIGS. 1 to 4) of the cylindrical inner surface 15 of cylinder 14 and the outer surface of sleeve 30 between arrows $E_1$ and $E_2$ showing the relative positions of exhaust port 64, and inlet port 62 and the movement of exhaust port 74 and inlet port 72.

Figure 5:
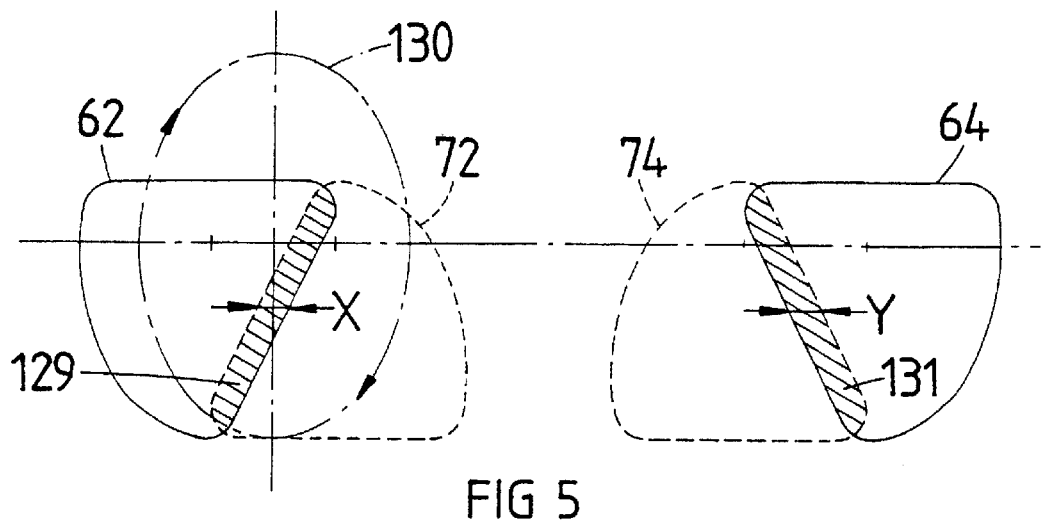
FIGS. 5 to 8 are partial developed elevations showing various relative positions of the inlet and exhaust ports.

FIG. 5 is drawn with sleeve crank pin 36 at the Bottom Dead Centre position as shown in FIG. 4.

Figure 6:
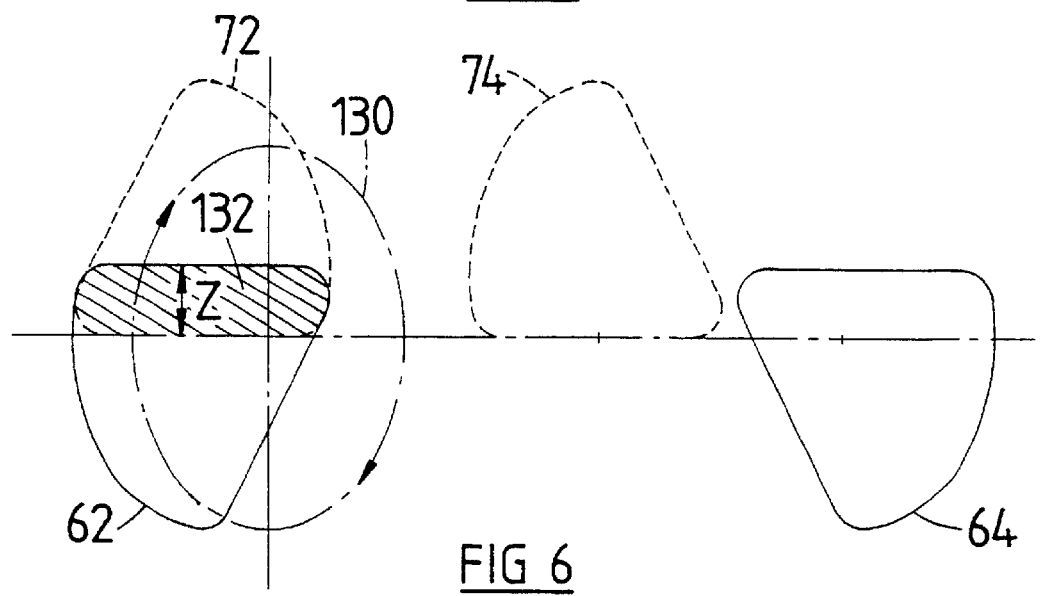

FIG. 6 is drawn with sleeve crank pin 36 at 90° after Bottom Dead Centre.

Figure 7:
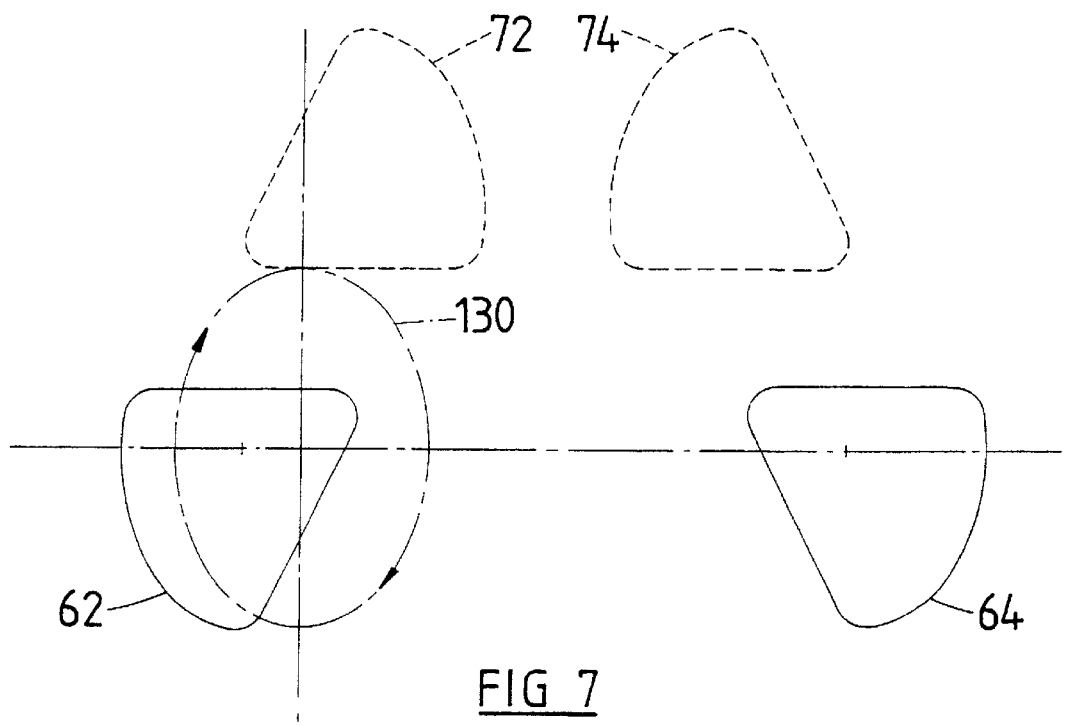

FIG. 7 is drawn with sleeve crank pin 36 at Top Dead Centre.

Figure 8:
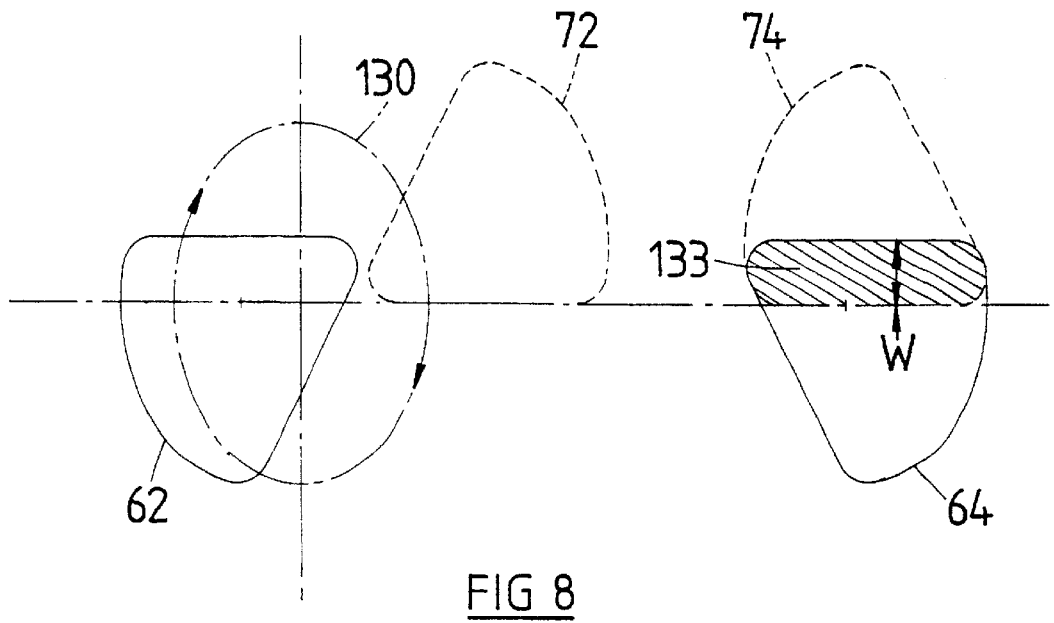

FIG. 8 is drawn with sleeve crank pin 36 at 90° after Top Dead Centre.

In FIGS. 5 to 8 the sleeve ports 72 and 74 are shown in dotted or broken outline whereas the cylinder barrel ports 62 and 64 are shown in solid or continuous outline. The orbit or motion path of the sleeve and its ports is shown by ellipses marked 130. The major axis of ellipse 130 is of course twice the crank radius M (FIG. 4) and the minor axis is determined by the relationship between, or the magnitudes of, crank radius M, the lateral distance N (FIG. 4) between the main cylinder axis or centreline and the centreline of the part spherical bearing 37, and the outside radius of sleeve 30.

In FIG. 5 sleeve inlet port 72 has uncovered the inclined "opening" edge of cylinder barrel inlet port 62 resulting in open port area 129. The lateral width X of open area 129 is increasing rapidly due to the circumferential velocity component of sleeve orbit 130 being at a maximum. Similarly the lateral width Y of open area 131 is decreasing rapidly, which will result in rapid closure of exhaust ports 64 and 74.

In FIG. 6 sleeve inlet port 72 is nearly in the closed position. The vertical height Z of open area 132 is rapidly decreasing because the vertical velocity component of sleeve orbit 130 is at a maximum. The exhaust ports 74 and 72 are closed.

In FIG. 7 all ports are closed, the lower edges of sleeve ports 72 and 74 have passed well above the junk head sealing rings 33 and piston 20 is at or near Top Dead Centre on the firing stroke.

In FIG. 8 the lower edge of sleeve exhaust port 74 has uncovered the upper edge of cylinder barrel port 64. The vertical height W of open area 133 is increasing rapidly as the vertical velocity component of sleeve orbit 130 has once again just reached a maximum value. The inlet ports 62 and 72 are closed.

The illustrated preferred engine and its operation differ in important respects from a conventional sleeve-valved engine. Firstly, it is found that the primary influence of the thermal resistance of body 40 afforded by its heat resistant material and integral form, and its insulation from its surroundings, optimised by such devices as the narrow neck 47, temperature gradients around undercut 46 and space 48 causing a circulation of air within the jacket formed by these spaces, together with secondary effects such as end-losses at face 44 and at the piston 21 and the influence of incoming fresh air, combine to determine an equilibrium temperature for surfaces 42a, 44 much higher than is conventional. Moreover, the temperature of surfaces 42a, 44 is substantially higher than the temperature of the wall surface of main chamber 52. Indeed, it is thought desirable that this temperature difference be in the range 400° to 1000° C.

A significant preferred element of the illustrated design that facilitates combustion chamber performance is believed to the integral mounting of the injector body in the solid heat resistant material of body 40.

The high temperature in the combustion chamber 54 also further reduces the ignition "delay period", by providing heat to rapidly vaporise the injected fuel droplets. This effect augments the known benefits of the swirl mentioned earlier in reducing the delay period by enhancing rapid mixing of fuel and air.

It will further be appreciated that this temperature differential can be maintained at even higher preferred values because of the lack of restraint on both longitudinal and lateral expansion of body portion 42. In particular, body 40 is free to expand longitudinally outwardly to accommodate longitudinal expansion of portion 42 as the temperature of internal surface 42a rises, while the gap 49 about body 40 similarly accommodates lateral or radial expansion. Gap 49 will typically be about 0.2 mm, and the maximum radial expansion of head portion 43 arising from the heated body portion 42 is thought to be somewhat less than this.

Secondly, as the expansion stroke commences, and the gas expands both downwardly and laterally into main chamber 52 at the cross-section 53 aligned with shoulder 41, a substantial temperature differential between combustion chamber 54 and shoulder 41, combined with the expansion of the gas and the level of sustained air or gas swirl about the common axis 11 of the chambers 52, 54 results in a highly stable swirling boundary layer of relatively cooler gases which follows the piston crown down adjacent the cylindrical wall 31 of sleeve 30. This is thought to be the explanation of the observed unusually low cylinder wall temperatures. Moreover, the incoming air charge forming a fairly high speed swirling or spiral layer inside the bore 31 of the main chamber 52 is thought itself to have a significant cooling effect on surface 31 and also on the lower face 41 of junk head 45, during the inlet stroke. The steady state mean external wall temperature of cylinder 14 has been measured at 100° C. above ambient with the engine working at a bmep of 7 bar, despite the total absence of any forced fluid cooling by either water or air. This temperature rise is substantially independent of engine operating speed, an effect quite contrary to observation with both conventional engines and in the development of ceramic-fitted adiabatic engines. Perhaps, this arises from the expectation that, as engine operating speed is increased, the aforementioned "inlet cooling effect" would also increase.

It is emphasised that the mechanisms just proposed are thought to be a likely explanation of the observed effect but that the present applicant is not stating that the observed low cylinder wall temperature certainly or solely arises from this mechanism. Other mechanisms may be involved. The swirl ratio in the combustion chamber of the illustrated engine has been measured to be in the region of 9.2, but the present applicant believes that a swirl ratio in the combustion chamber greater than 6:1, eg. in the range 10 to 25:1 or higher, is desirable for enhancing the effects of the invention. This is, by convention, the value measured for the combustion chamber: it will be understood that the swirl ratio generated in the main chamber will be less, inversely related to the ratio of the chamber diameters, although other effects will affect/influence the exact air speed, especially adjacent peripheral and end surfaces. It is preferred that the swirl ratio in the main chamber 52 be at least 3:1.

A further effect of the swirl, and a third difference from conventional engines of this general type, that is thought to arise for the air swirl in combustion chamber 54 is a temperature gradient from a relatively hotter core to a relatively cooler periphery. The present applicant is not certain of the extent to which this effect occurs, if at all, but it may further assist in maximising achievable combustion chamber temperatures.

A fourth difference lies in the proportions of the combustion chamber 54. In Ricardo's book referred to above, the length to diameter ratio of the combustion chamber is recommended to be 0.842 and all research and production engines illustrated in the book have this ratio in the range 0.76 to 0.88. In contrast, the present applicant prefers that the ratio L/D, where L is the axial length of combustion chamber 54 and D is the uniform diameter of combustion chamber 54, should be 0.9 or greater, preferably greater than 1.0 and advantageously substantially greater, for example of the order of 2 to 4 or greater. If combustion chamber 54 is made relatively elongate, it is thought this enhances the ultimate cooling effect of the swirling stable layer adjacent cylindrical surface 31. The areas of the end face 44 of the combustion chamber and of the facing end surface of piston crown 21 are reduced relative to the lateral surface area, and so end losses are diminished. Moreover, the distance or "throw" of the fuel spray from injector tip 102 may be reduced to less than L, whereby the lowest portion of the air in combustion chamber 54 remains cooler. Higher L relative to D also further reduces the initial heating effect of the incoming air caused by contact with hot combustion chamber surfaces and the subsequent reduction in volumetric efficiency.

The cool temperature of the main cylinder body, and the remaining environment, is indicative of near adiabatic operation. There is no need for a conventional air or water cooling system and indeed none is provided. However the low temperature of the system generally has a further consequence: most common lubricating oils require a higher temperature than found in the crankcase of this engine to achieve correct functional viscosity. To resolve this difficulty, advantage is taken of circulation of the lubricant for the crankcase through passages or galleries 110 in main cylinder 14 between the inlet and exhaust ports 60–62, 64, 65 primarily in order to reduce the temperature differential between the inlet and exhaust ports which would otherwise give rise to excessive "out of round" distortion at the sleeve interfaces, although this latter problem could of course be met by using conventional circulating coolant. The secondary benefit of this configuration is heating of the oil to achieve functional viscosity.

In general, it will be seen that the arrangement is designed to allow no or minimal preheating of incoming air charges by hot combustion chamber walls.

A well-known formula for the theoretical value of the indicated air standard thermal efficiency (ASTE) of an ideal diesel cycle is the following expression:

$$ASTE = 1 - [\{T_4 - T_1\}/k\{T_3 - T_2\}]$$

where the constant k is the ratio of specific heats, in this case taken to be 1.4.

The temperature parameters in this expression comprise the ambient temperature $T_1$, the temperature $T_2$ at the conclusion of compression and immediately prior to the commencement of combustion, the combustion temperature $T_3$, and the temperature $T_4$ at the conclusion of expansion and the start of exhaust. For the illustrated engine at the minimum brake specific fuel consumption point (which here, as typically, approximately coincides with maximum brake manufactured pressure) the exhaust above ambient temperature, ie. $T_4 - T_1$, has been measured consistently during extensive testing as typically in the range of 160°–200° C., while $T_3 - T_2$ has been estimated by established methods at around 1900° C.

With these values in the above expression, the ASTE was calculated to be of the order of 93%. For a conventional production diesel engine of similar cylinder size to the prototype and operating at the same duty point, the ASTE calculates to approximately 69%. At lower duty points the calculated differences in ASTE are even greater.

It will be appreciated from the above discussion that the illustrated engine has a number of operating advantages, including but not limited to the following:

(i) Because of the described properties of heat-resistant body 40 and its environment, a high equilibrium operating temperature is attained in combustion chamber 54, and heat losses preceding, during and following combustion are reduced. As a further result it is possible to achieve satisfactory operation with a significantly lower compression ratio than would otherwise be possible.

(ii) There is minimal heat loss to the cylinder wall in the expansion stroke, an effect believed to arise by virtue of the stable high-swirl stable and lower temperature gas layer against surface 31.

(iii) There is also minimal heat loss during the compression stroke, believed to be due to the combined effect of the high-swirl gas layer and the properties of heat-resistant body 40 and its environment.

(iv) The engine thus exhibits near adiabatic operation and hence there is no need for a conventional air or water cooling system. A prototype engine has been designed and constructed as generally shown in FIGS. 1 to 4 and throughout testing has consistently operated at or close to 95% of perfect adiabatic operation. Analysis of test results clearly indicates that operation at close to 98% of adiabatic can be achieved.

Such near-adiabatic operation has been achieved without the necessity of high operating temperatures for pistons and cylinder walls; turbocharging or supercharging; compounding; bottoming cycles; use of ceramics; any specific or conventional means of cooling the cylinder head or barrel; or higher than normal exhaust gas temperatures and without secondary expanders. The absence of these features, but the presence of near-adiabatic operation, is contrary to expectation as reported above.

This outcome is to be contrasted with a statement in Diesel Engine Reference Book, eds. Challen & Baranescu, at p.107 (2nd edition 1999) that "use of an adiabatic engine would of course result in a very considerable increase in exhaust temperature".

(v) As a result of these effects, there is close adherence to the parameters required for optimum ASTE in the expression above, ie high $T_3 - T_2$ and low $T_4 - T_1$.

(vi) Because a sleeve-valved engine design is adopted in preference to a poppet-valved engine, not only is a high swirl ratio achieved and maintained but a very high volumetric efficiency is achieved and maintained despite the high operating temperature of combustion chamber 54. This latter effect is due to the fact that the incoming air charge effectively does not come into contact with the hot combustion chamber 54 until after the compression stroke has commenced i.e. after the closure of the inlet ports and the air in the main chamber 52 starts to transfer to combustion chamber 54.

(vii) The known high mechanical efficiencies of sleeve-valved engines are available to the system.

(viii) By arranging a thermal barrier about combustion chamber 54, and having a cool main cylinder, the applicant avoids or minimises problems encountered in known or proposed ceramic-fitted adiabatic engine designs as a result of high temperatures in the cylinders, pistons and valves (typically 400 to 1000° C.), piston rings and lubricant (typically up to 500° C.) and exhaust gas (up to 1000° C.).

(ix) By shortening the ignition delay period (as a result of high temperature and high swirl in chamber 54), the overall duration of the combustion period is shortened, and combustion more closely approximates constant volume (the ideal) rather than constant pressure.

(x) The high achievable swirl ratios facilitate the use of single spray injectors in a high L/D environment.

(xi) All of these effects combine to substantially raise the brake mean effective pressure (bmep).

(xii) High operating speeds are achievable.

(xiii) In a conventional sleeve valve CI engine as defined and developed by Ricardo and others over many years, an increase in air swirl ratio would automatically cause an increase in heat transfer rate, particularly away from the combustion chamber and powerfully reduce the possibility of adiabatic operation. In the engine described herein, that fundamental design problem, compromise or nexus is eliminated, thus allowing the full benefits which are available from high air swirl ratios.

Again, it is instructive to contrast this outcome with another statement in the aforementioned "Diesel Engine Reference Book", at p.107, that "quiescent direct injection [combustion] chambers which have the lowest surface areas and the lowest gas velocities give the lowest [heat] losses".

(xiv) These benefits can be achieved without incurring the penalties which would otherwise arise from add-ons such as turbocharging; supercharging; secondary expansion; bottoming cycles or the use of ceramics or high surface temperatures in the main working chamber. Furthermore no conventional cooling system using air or water is required.

It will of course be well understood by those skilled in the engine art that the design of any particular engine in accordance with the invention will require a set of compromises among the preferred elements of the invention in order to achieve given performance criteria. For example, the proportions of combustion chamber 54, including its L/D ratio, will be affected by its dimensional relationship to the dimensions of main chamber 52—both in turn together determining the compression ratio and, along with port design, the respective swirl ratios for the two chambers. The value of L/D also affects other parameters, as discussed earlier, as does the injector/s position.

In an alternative embodiment, the combustion chamber 54 could be provided in the piston rather than in the junkhead. This would be less satisfactory, for example because of the increased weight of the piston, and the displacement of the gudgeon pin axis or alternatively elongation of the piston, but these disadvantages would not be insurmountable if the application was warranted. A further disadvantage would be the need to provide a screen or guard to prevent contact between the lubricating oil and the hot heat-resistant body defining the combustion chamber. In this alternative embodiment, it would be expected that the injector would still be disposed within the junkhead, or within the cylinder head in an overhead valve 4-stroke or 2-stroke ported version.

The illustrated engine is a 4-stroke sleeve-valved diesel or compression ignition engine. The concepts of the invention are also applicable to 4-stroke sleeve-valved spark or glow plug ignition engines, 4-stroke poppet valve engines, 2-stroke engines with sleeve valves, and/or poppet valves and/or cylinder ports controlled by piston movement, to any of these engines with the combustion chamber mounted in the piston, and to any of these engines using spark or glow plug ignition with gas or liquid fuel or gas fuelled with diesel pilot ignition. It is also emphasised that the concepts of the invention may be combined in a single apparatus with the variable timing sleeve-valved arrangements of the present applicant's Australian patent 600913.

Where poppet valves are employed instead of a sleeve valve, a suitable arrangement for generating the desired form of swirl is illustrated in FIGS. 7.5 and 7.6 of the aforementioned text by Ricardo et al (Ps 100,101 of the 4th ed.)

It is further emphasised that the invention is not confined to cases where combustion chamber 54 is cylindrical. Any other functional shape can be employed, including arrangements with a neck or restricted opening into main chamber 52. Where this restriction was a significant proportion of the cross-section, the engine may operate as an indirect injection engine.

The invention of course extends to reciprocating machines having functions other than as engines, eg. as compressors or pumps.

What is claimed is:

1. An internal combustion engine including:
    a housing and piston means that are cyclically relatively displaceable along an axis to define a variable volume working chamber;
    means to admit air and fuel to said working chamber for forming an ignitable mixture after compression of the air therein; and
    means to exhaust combustion products from said working chamber;
    wherein said variable volume working chamber includes at least two sub-chambers substantially co-axial about and mutually displaced on said axis and in communication at a cross section at which gas in one sub-chamber may expand at least partially laterally as it flows from said sub-chamber into the other sub-chamber;
    wherein said air admission means, said exhaust means and said sub-chambers are arranged so that a swirl of gas is generated and maintained about said axis in both of said sub-chambers during operation of the engine;
    and wherein said one sub-chamber is sealed and defined laterally and at an end by integral heat resistant or low thermal conductivity wall structure having a lateral exterior, a heat insulation jacket about substantially the whole of said lateral exterior of said wall structure, and associated heat dissipation means, arranged so that, during operation of the engine, surfaces of said wall structure bounding said one sub-chamber are maintained at a temperature which is substantially higher than wall surfaces bounding said other sub-chamber.

2. An internal combustion engine according to claim 1 wherein said sub-chambers are arranged whereby the engine operates in a direct injection mode.

3. An internal combustion engine according to claim 1 wherein said sub-chambers are arranged whereby the engine operates in an indirect injection mode.

4. An internal combustion engine according to claim 1 wherein said fuel admission means includes a fuel injector mounted intimately in a complementary opening or recess in said integral wall structure.

5. An internal combustion engine according to claim 4 wherein said fuel injector includes a tip and passages for cooling the tip.

6. An internal combustion engine according to claim 1 wherein said fuel admission means includes a flow passage arranged to open into said working chamber at a radius that divides the said one sub-chamber into a central cylindrical portion and an annular outer portion, which portions are of substantially equal volumes.

7. An internal combustion engine according to claim 1 wherein said one sub-chamber is of mean width D and mean length L away from L said cross-section, and a ratio L/D is 0.9 or greater.

8. An internal combustion engine according to claim 7 wherein said one sub-chamber is cylindrical, of diameter D and axial length L.

9. An internal combustion engine according to claim 1 wherein said cross-section is equal to or less than said one sub-chamber.

10. An internal combustion engine according to claim 1 wherein said wall structure is free to expand longitudinally and laterally with respect to said axis sufficiently to accommodate thermal expansion arising from said temperature at the surfaces of the wall structure bounding said one sub-chamber.

11. An internal combustion engine according to claim 1 function including passages or galleries in a main cylinder of said housing extending about said other sub-chamber, for flowing lubricant therethrough, which lubricant is thereby effective to reduce or control temperatures or temperature differences across or around said cylinder, while being thereby heated to a desired functional viscosity.

12. An internal combustion engine according to claim 1 wherein said swirl of gas in said other sub-chamber is such that there is formed therein a swirling relatively cooler boundary layer.

13. An internal combustion engine according to claim 12 wherein said cooler boundary layer is effective to cool both peripheral and end walls of said other sub-chamber.

14. An internal combustion engine according to claim 1 wherein said swirl of gas is such that a swirl ratio in said one sub-chamber is at least 6:1.

15. An internal combustion engine according to claim 14 wherein said swirl ratio is in the range from about 10:1 to about 25:1.

16. An internal combustion engine according to claim 1 wherein said swirl of gas is such that a swirl ratio in said other sub-chamber is at least 3:1.

17. An internal combustion engine according to claim 1 wherein said swirl of gas in said one chamber is such that there is a radial temperature gradient in a gas flow of said one sub-chamber, with a relatively hotter core and a relatively cooler periphery.

18. An internal combustion engine according to claim 1 wherein said air admission means and said exhaust means include ports in said housing, and reciprocable sleeve valve-means controlling the ports.

19. An internal combustion engine according to claim 18 wherein said one sub-chamber is disposed within junkhead means opposed to said piston means.

20. An internal combustion engine according to claim 18 wherein said housing and ports are configured so as to allow at most minimal preheating of incoming air charges by hot combustion chamber walls.

21. An internal combustion engine according to claim 1 wherein said housing includes respective cylindrical portions laterally defining said sub-chambers, and an annular shoulder between said cylindrical portions opposed to said piston means.

22. An internal combustion engine according to claim 21 wherein said shoulder is provided by an annular head member.

23. An internal combustion engine according to claim 22 wherein said heat dissipation means includes annular neck means bridged to said wall structure for reducing thermal conductance from the wall structure to the annular head member.

24. An internal combustion engine according to claim 23 wherein said shoulder and said neck means are formed integrally with said wall structure defining said one sub-chamber.

25. An internal combustion engine according to claim 1 which exhibits substantially adiabatic operation.

26. An internal combustion engine according to claim 1 wherein said one sub-chamber is substantially defined within said piston means.

27. An internal combustion engine according to claim 1 wherein said sub-chambers are generally axially symmetrical about said axis, which is a longitudinal generally centre line axis of said housing.

28. An internal combustion engine according to claim 1 wherein said ignitable mixture is ignitable by compression ignition.

29. An internal combustion engine according to claim 1 wherein said ignitable mixture is ignitable by spark or glow plug ignition.

30. An internal combustion engine according to any claim 1 wherein said air and fuel are mixed substantially wholly in said working chamber.

31. An internal combustion engine according to claim 1 wherein said air and fuel are mixed at least partially externally of said working chamber.

32. An internal combustion engine including:

a housing and piston means that are cyclically relatively displaceable along an axis to define a variable volume working chamber;

means to admit air and fuel to said working chamber for forming an ignitable mixture after compression of the air therein; and means to exhaust combustion products from said working chamber;

wherein said variable volume working chamber includes at last two sub-chambers mutually displaced on said axis and in communication at a cross section at which gas in one sub-chamber may expand at least partially laterally as it flows from said one sub-chamber into the other sub-chamber;

wherein said one sub-chamber is of mean width D and mean length L away from said cross-section, and a ratio L/D is 0.9 or greater; and wherein said air admission means includes intake ports positioned and arranged to impart a swirl to gases in said chamber about said axis, including said laterally expanding gas flowing from said one sub-chamber into said other sub-chamber, whereby there is formed, during operation of the engine, a swirling cooler boundary layer in said other sub-chamber and a swirling flow in said one sub-chamber, a swirl ratio of said swirling flow in said one chamber being at least 6:1.

33. An internal combustion engine according to claim 32 wherein said cooler boundary layer is effective to cool both peripheral and end walls of said other sub-chamber.

34. A method of operating an internal combustion engine at least near adiabatically, which engine has a housing and piston means defining a working chamber, the method including:

cyclically relatively displacing said housing and piston means along an axis to define a variable volume working chamber;

admitting air and fuel to said working chamber;

compressing the air in said working chamber to form an ignitable compressed air/fuel mixture;

causing combustion of said compressed air/fuel mixture;

exhausting gases from the working chamber including causing the gases to expand at least partially laterally as the gases flow from one sub-chamber of said working chamber into the other sub-chamber thereof; and generating and maintaining a swirl of gas about said axis in both of said sub-chambers while the engine is operating;

wherein wall surfaces bounding said one sub-chamber are maintained at a temperature which is substantially higher than wall surfaces bounding said other sub-chamber.

35. A reciprocatory machine, including:

a housing and piston means that are cyclically relatively displaceable along an axis to define a variable volume working chamber;

means to admit fluid to said working chamber; and means to exhaust fluid products from said working chamber;

wherein said variable volume working chamber includes at least two sub-chambers initially displaced on said axis and in communication at a cross section at which gas in one sub-chamber may expand at least partially laterally as it flows from said one sub-chamber into the other sub-chamber;

wherein said fluid admission means, said exhaust means and said sub-chambers are arranged so that a swirl of fluid is generated and maintained about said axis in both of said sub-chambers during operation of the machine;

and wherein said one sub-chamber is defined laterally and at an end by a wall structure with associated heat dissipation means arranged so that, during operation of the machine, the surfaces of said wall structure bounding said one sub-chamber are maintained at a temperature which is substantially higher than wall surfaces bounding said other sub-chamber.

36. An internal combustion engine including:

a housing and piston means that are cyclically relatively displaceable along an axis to define a variable volume working chamber;

means to admit air and fuel to said working chamber for forming an ignitable mixture after compression of the air therein; and means to exhaust combustion products from said working chamber;

wherein said variable volume working chamber includes at least two sub-chambers mutually displaced on said axis and in communication at a cross section at which gas in one sub-chamber may expand at least partially laterally as it flows from said one sub-chamber into the other sub-chamber;

wherein said air admission means, said exhaust means and said sub-chambers are arranged so that a swirl of gas is generated and maintained about said axis in both of said sub-chambers during operation of the engine; and wherein said fuel admission means includes a flow passage arranged to open into said working chamber at a radius that divides the said one sub-chamber into a central cylindrical portion and an annular outer portion, which portions are of substantially equal volumes.

37. An internal combustion engine according to claim 36 wherein said one sub-chamber is of mean width D and mean length L away from said cross-section, and a ratio L/D is 0.9 or greater.

38. An internal combustion engine according to claim 37 wherein said one sub-chamber is cylindrical, of diameter D and axial length L.

39. An internal combustion engine according to claim 36 wherein said cross-section is equal to or less than said one sub-chamber.

40. An internal combustion engine including:

a housing and piston means that are cyclically relatively displaceable along an axis to define a variable volume working chamber;

means to admit air and fuel to said working chamber for forming an ignitable mixture after compression of the air therein; and means to exhaust combustion products from said working chamber;

wherein said variable volume working chamber includes at least two sub-chambers mutually displaced on said axis and in communication at a cross section at which gas in one sub-chamber may expand at least partially laterally as it flows from said one sub-chamber into the other sub-chamber;

wherein said air admission means, said exhaust means and said sub-chambers are arranged so that a swirl of gas is generated and maintained about said axis in both of said sub-chambers during operation of the engine; and wherein said swirl of gas in said other sub-chamber is such that there is formed therein a swirling relatively cooler boundary layer.

41. An internal combustion engine according to claim 40, wherein said cooler boundary layer is effective to cool both peripheral and end walls of said other sub-chamber.

42. An internal combustion engine according to claim 40 wherein said swirl of gas is such that a swirl ratio in said other sub-chamber is at least 3:1.

43. An internal combustion engine including:

a housing and piston means that are cyclically relatively displaceable along an axis to define a variable volume working chamber;

means to admit air and fuel to said working chamber for forming an ignitable mixture after compression of the air therein; and means to exhaust combustion products from said working chamber;

wherein said variable volume working chamber includes at least two sub-chambers mutually displaced on said axis and in communication at a cross section at which gas in one sub-chamber may expand at least partially laterally as it flows from said one sub-chamber into the other sub-chamber;

wherein said air admission means, said exhaust means and said sub-chambers are arranged so that a swirl of gas is generated and maintained about said axis in both of said sub-chambers during operation of the engine; and wherein said swirl of gas in said one chamber is such that there is a radial temperature gradient in the gas flow of said one sub-chamber, with a relatively hotter core and a relatively cooler periphery.

44. An internal combustion engine according to claim 43, wherein said swirl of gas is such that a swirl ratio in said one sub-chamber is at least 6:1.

45. An internal combustion engine according to claim 44 wherein said swirl ratio is in a range from about 10:1 to about 25:1.

46. An internal combustion engine including:

a housing and piston means that are cyclically relatively displaceable along an axis to define a variable volume working chamber;

means to admit air and fuel to said working chamber for forming an ignitable mixture after compression of the air therein; and means to exhaust combustion products from said working chamber;

wherein said variable volume working chamber includes at least two sub-chambers mutually displaced on said axis and in communication at a cross section at which gas in one sub-chamber may expand at least partially laterally as it flows from said one sub-chamber into the other sub-chamber;

wherein said air admission means, said exhaust means and said sub-chambers are arranged so that a swirl of gas is generated and maintained about said axis in both of said sub-chambers during operation of the engine; and wherein said one sub-chamber is of mean width D and mean length L away from said cross-section, and a ratio L/D is 0.9 or greater.

47. An internal combustion engine according to claim 46 wherein said one sub-chamber is cylindrical, of diameter D and axial length L.

48. An internal combustion engine according to claim 46 wherein said cross-section is equal to or less than said one sub-chamber.

49. An internal combustion engine including:
a housing and piston means that are cyclically relatively displaceable along an axis to define a variable volume working chamber;
means to admit air and fuel to said working chamber for forming an ignitable mixture after compression of the air therein; and
means to exhaust combustion products from said working chamber;
wherein said variable volume working chamber includes at least two sub-chambers mutually displaced on said axis and in communication at a cross section at which gas in one sub-chamber may expand at least partially laterally as it flows from said one sub-chamber into the other sub-chamber; and
wherein said one chamber is defined by wall structure free to expand longitudinally and laterally with respect to said axis sufficiently to accommodate thermal expansion arising from the temperature at surfaces of said wall structure bounding said one sub-chamber.

50. An internal combustion engine according to claim 1, wherein said air admission means opens into said other sub-chamber, and said air admission means, said exhaust means and said sub-chambers-are arranged so that a swirl of gas is generated in said other sub-chamber and maintained about said axis in both of said sub-chambers.

51. An internal combustion engine according to claim 1 wherein said heat dissipation means is a gap narrower than said jacket for aspirating said jacket.

52. An internal combustion engine according to claim 51 wherein said gap is an annular gap with respect to said axis.

53. An internal combustion engine according to claim 50 wherein said heat dissipation means is a gap narrower than said jacket for aspirating said jacket.

54. An internal combustion engine according to claim 40 wherein said one sub-chamber is of mean width D and mean length L away from said cross-section, and a ratio L/D is 0.9 or greater.

55. An internal combustion engine according to claim 43 wherein said one sub-chamber is of mean width D and mean length L away from said cross-section, and a ratio L/D is 0.9 or greater.

56. An internal combustion engine according to claim 49 wherein said one sub-chamber is of mean width D and mean length L away from said cross-section, and a ratio L/D is 0.9 or greater.

57. An internal combustion engine according to claim 49 wherein said wall structure is free to expand longitudinally and laterally with respect to said axis sufficiently to accommodate thermal expansion arising from said temperature at surfaces of said wall structure bounding said one sub-chamber.

58. An internal combustion engine according to claim 32, wherein said swirl of gas in said other sub-chamber is such that there is formed therein a swirling relatively cooler boundary layer.

59. An internal combustion engine according to claim 36, wherein said swirl of gas in said other sub-chamber is such that there is formed therein a swirling relatively cooler boundary layer.

60. An internal combustion engine according to claim 43, wherein said swirl of gas in said other sub-chamber is such that there is formed therein a swirling relatively cooler boundary layer.

61. An internal combustion engine according to claim 46, wherein said swirl of gas in said other sub-chamber is such that there is formed therein a swirling relatively cooler boundary layer.

62. An internal combustion engine according to claim 36 wherein said swirl of gas is such that a swirl ratio in said one sub-chamber is at least 6:1.

63. An internal combustion engine according to claim 40 wherein said swirl of gas is such that a swirl ratio in said one sub-chamber is at least 6:1.

64. An internal combustion engine according to claim 46 wherein said swirl of gas is such that a swirl ratio in said one sub-chamber is at least 6:1.

65. An internal combustion engine according to claim 32 wherein said swirl of gas is such that a swirl ratio in said other sub-chamber is at least 3:1.

66. An internal combustion engine according to claim 36 wherein said swirl of gas is such that a swirl ratio in said other sub-chamber is at least 3:1.

67. An internal combustion engine according to claim 43 wherein said swirl of gas is such that a swirl ratio in said other sub-chamber is at least 3:1.

68. An internal combustion engine according to claim 46 wherein said swirl of gas is such that a swirl ratio in said other sub-chamber is at least 3:1.

69. An internal combustion engine according to claim 32 wherein said swirl of gas in said one chamber is such that there is a radial temperature gradient in a gas flow of said one sub-chamber, with a relatively hotter core and a relatively cooler periphery.

70. An internal combustion engine according to claim 36 wherein said swirl of gas in said one chamber is such that there is a radial temperature gradient in a gas flow of said one sub-chamber, with a relatively hotter core and a relatively cooler periphery.

71. An internal combustion engine according to claim 40 wherein said swirl of gas in said one chamber is such that there is a radial temperature gradient in a gas flow of said one sub-chamber, with a relatively hotter core and a relatively cooler periphery.

72. An internal combustion engine according to claim 46 wherein said swirl of gas in said one chamber is such that there is a radial temperature gradient in a gas flow of said one sub-chamber, with a relatively hotter core and a relatively cooler periphery.

73. An internal combustion engine according to claim 32 wherein said air admission means and said exhaust means include ports in said housing, and reciprocable sleeve valve means controlling the ports.

74. An internal combustion engine according to claim 36 wherein said air admission means and said exhaust means include ports in said housing, and reciprocable sleeve valve means controlling the ports.

75. An internal combustion engine according to claim 40 wherein said air admission means and said exhaust means include ports in said housing, and reciprocable sleeve valve means controlling the ports.

76. An internal combustion engine according to claim 43 wherein said air admission means and said exhaust means include ports in said housing, and reciprocable sleeve valve means controlling the ports.

77. An internal combustion engine according to claim 46 wherein said air admission means and said exhaust means include ports in said housing, and reciprocable sleeve valve means controlling the ports.

78. An internal combustion engine according to claim 49 wherein said air admission means and said exhaust means include ports in said housing, and reciprocable sleeve valve means controlling the ports.

79. An internal combustion engine according to claim 32, wherein said air admission means opens into said other sub-chamber, and said air admission means, said exhaust means and said sub-chambers are arranged so that a swirl of gas is generated in said other sub-chamber and maintained about said axis in both said sub-chambers.

80. An internal combustion engine according to claim 36, wherein said air admission means opens into said other sub-chamber, and said air admission means, said exhaust means and said sub-chambers are arranged so that a swirl of gas is generated in said other sub-chamber and maintained about said axis in both said sub-chambers.

81. An internal combustion engine according to claim 43, wherein said air admission means opens into said other sub-chamber, and said air admission means, said exhaust means and said sub-chambers are arranged so that a swirl of gas is generated in said other sub-chamber and maintained about said axis in both said sub-chambers.

82. An internal combustion engine according to claim 46, wherein said air admission means opens into said other sub-chamber, and said air admission means, said exhaust means and said sub-chambers are arranged so that a swirl of gas is generated in said other sub-chamber and maintained about said axis in both said sub-chambers.

83. An internal combustion engine according to claim 32 wherein said swirl ratio of said swirling flow in said one chamber is in the range 10:1 to 25:1.

\* \* \* \* \*